Dec. 4, 1951   E. M. SHIEPE   2,577,592
INDUCTANCE AND SELF-CAPACITANCE MEASURING DEVICE
Filed Jan. 30, 1946
*Fig. 1.*
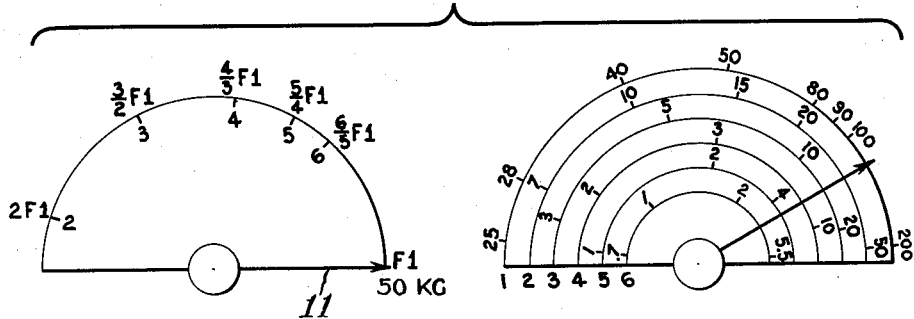
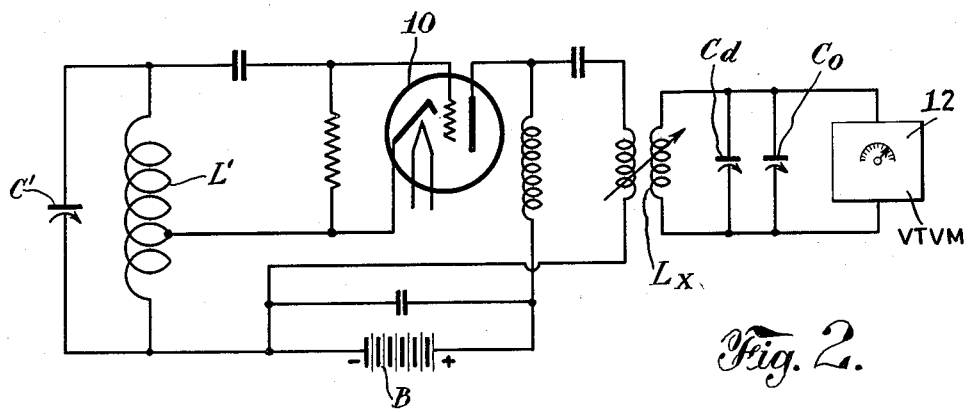
*Fig. 2.*
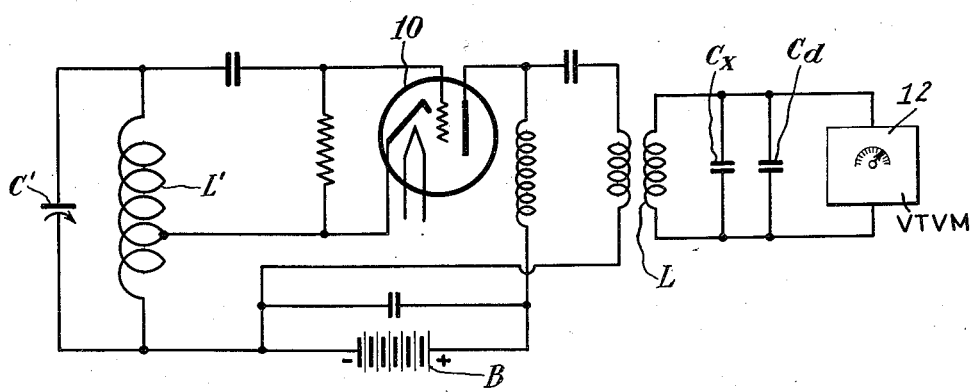
*Fig. 3.*
INVENTOR
EDWARD M. SHIEPE
BY
*Ely & Pattison*
ATTORNEYS.

Patented Dec. 4, 1951

2,577,592

UNITED STATES PATENT OFFICE 2,577,592

INDUCTANCE AND SELF-CAPACITANCE MEASURING DEVICE

Edward M. Shiepe, Brooklyn, N. Y.

Application January 30, 1946, Serial No. 644,284

4 Claims. (Cl. 175—183)

This invention relates to new and useful improvements in devices for measuring unknown quantities such as inductance and capacitance in oscillatory circuits.

The object of the invention is to provide a device which may be operated by anyone without requiring calculations but merely requiring two dials to be manipulated whereby the measurement of these unknown quantities may be obtained rapidly by reading from certain scales on the devices after a few simple manipulations thereof have been effected.

Further and more specific objects, features, and advantages will more clearly appear from the specification hereinafter set forth especially when taken in connection with the accompanying drawing which illustrates present preferred forms which the invention may assume and which form part of the specification.

Briefly and in very general terms the invention includes an oscillation generator coupled to a measuring circuit. The generator has several harmonics which are appropriately indicated on a dial over which the arm of the oscillator swings as the condenser in said generator is moved. The measuring circuit contains an unknown quantity as inductance or capacity and is capable of being tuned to resonance with the generator set at a given starting value or position. The measuring circuit has a variable condenser connected to an arm swinging over a dial having a plurality of scales calibrated in terms of the unknown quantity, each scale representing quantities corresponding to the particular harmonic setting of the oscillator arm. The measuring circuit is tuned to resonance with the generator arm in the starting position and then the generator arm is moved to the next nearest position of resonance. The number of the harmonic noted on the scale of the generator will indicate the scale of the measuring circuit condenser which is to be read to determine the value of the unknown quantity.

A present preferred form which the invention may assume is illustrated in the drawing, of which, Figure 1 is a diagrammatic representation of the cooperating dials employed with the circuit, the dial of the generator or oscillator being at the left and the measuring dial at the right.

Figure 2 is a schematic diagram of a circuit for measuring an unknown inductance.

Figure 3 is a schematic diagram of a circuit for measuring an unknown capacity.

The present preferred form which the invention may assume as shown herein comprises an oscillator shown in Figure 2 having a variable capacity C' and a fixed inductance L' in circuit with oscillator tube 10 and powered in this case by a battery B. This oscillator generator is designed to have strong harmonics at least up to the sixth in this instance. It is loosely coupled to a tuned circuit containing a variable condenser $Cd$, the unknown inductance $Lx$, a vernier capacity $Co$, and an indicator such as a vacuum tube voltmeter, magic-eye tube, etc. 12. The condensers tuning the oscillation generator and measuring circuits have calibrated scales affixed thereto which are separated as shown in Figure 1.

The oscillator condenser permits a frequency range of at least 2 to 1 and the condenser $Cd$ gives a net capacity range of at least 9 to 1 with the vernier $Co$ set at its maximum value. On the oscillator scale this 2 to 1 range is set off in terms of a frequency F1, such as 50 kc., and ranges from F1 through graduated steps to a value 2F1. As shown these steps are 6/5F1, 5/4F1, 4/3F1, 3/2F1 etc. Of course, it is obvious that instead of using a variable tuning condenser in the oscillator, a multi-contact switch may be employed, so that the switch will indicate the corresponding inductance scale and this is done by connecting a fixed condenser of proper value to each of the switch contacts. This feature is not shown however since it is obvious as a substitute for the arrangement shown.

The calibrated scale of the indicator has several scales thereon numbered from 1 to 6. The scale #1 is calculated from the fixed frequency F1 and the capacity $Cd$ at each point. The second scale is calibrated for the second harmonic of the oscillator, and since the frequency is doubled the inductance values for scale #2 on the indicator are ¼ of the corresponding values on scale #1; values on scale #3 are 1/9 of the values on scale #1; values on scale #4 are 1/16 of the values on scale #1 etc.

To make an inductance measurement of the inductance $Lx$, the pointer of the oscillator is set at the point F1. The condenser $Cd$ is moved until a resonance condition is indicated in the VTVM. The condenser $Cd$ is then left at this point and the oscillator condenser is then moved from the F1 position until a second resonance response is indicated on the VTVM. Such a second response will occur only at points 2, 3, 4, 5 and 6 on the oscillator scale and at no intermediate points. If the second resonance response occurs at point 2, then this informs the operator that the readings on the indicator scale must be taken from scale #2 thereon. The position on scale #2 of the indicator where the indicating arm of the detector condenser Cd was left indicates the inductance being measured, namely the inductance of the coil Lx. If the second response occurs at point #3 on the oscillator scale then scale #3 on the indicator scale is used for the reading of the unknown values. If at points 4, 5, or 6 then scales 4, 5, and 6 should be used respectively. If no second indication of resonance is obtained when the oscillator is varied from F1 to 2F1, then the 1st inductance scale should be used. It will thus be clear that the oscillator pointer 11 is employed to indicate which of the indicator scales shall be used to read the unknown values Lx.

It is to be noted that the entire first inductance scale represents measurement at the one frequency F1; the second scale at 2F1 only etc. in Figure 1, 6F1 represents the highest frequency used on this band, corresponding to the 6th harmonic of the oscillator.

Since the oscillator may deliver higher harmonics than the sixth in this case, and because a small enough coil Lx will register a response with such harmonics (for which there is no corresponding scale on the indicator) turning the oscillator to the next response position will give such next response in the region between F1 and the point 6. Because of the undesirability of having such spurious responses, it is well to filter out all harmonics higher than the sixth (in this case) from the oscillator output. In general, if there are N inductance scales, the filter must cut off the frequency $(N$ plus $1)F1$, and all higher frequencies. For simplicity, no filter circuit is shown in Figure 2.

The inductance value read in the above manner is the apparent inductance of the coil under test. Over the workable range of the inductance scales, two different positions of the pointer will be found to give resonance, and the values of inductance read on them will be found to vary slightly, depending upon the amount of self-capacitance in the coil under test. In order to find the pure inductance of the coil, it is necessary to decrease the capacitance of the vernier Co until the two inductances readings are identical. The amount of capacitance by which the vernier was decreased is the self-capacitance of the coil, and the inductance value at either position of resonance is the pure inductance of the coil. The vernier condenser may be directly calibrated in units of coil capacitance.

Any suitable frequency F1 may be used in the oscillator. In fact, several frequency bands are desirable to permit complete coverage of the useful inductance range. When bands are thus changed, if F1 is the lowest frequency of the 1st band, the next band may start at 10F1, the next at $10\sqrt{10}F1$, and the one after at 100F1, etc. In this manner, the same calibration points can be used on the inductance scales for units in millihenries, $$\frac{\text{microhenries}}{10}$$

microhenries etc. When oscillator bands are thus switched, the positions 2, 3, 4, and 5 on the oscillator (which indicate the scale to use on the indicator scale) are not altered.

For the measurement of condensers instead of inductances, a coil is switched into the measuring circuit and is, in Figure 3 numbered L and is of such a value of inductance that it tunes to a frequency of 2F1 with a large value of Cd in the measuring circuit. The oscillator is tuned to frequency 2F1 at point 2, and the calibrated condenser scale on the oscillator dial reads zero capacitance at this initial position. The unknown condenser Cx is connected across Cd. This lowers the natural frequency of the measuring circuit to something less than 2F1 and the resonance indication disappears. Now the oscillator pointer 11 is turned from 2F1 down towards F1, and one and only one resonance point can be found in this range. If the new point of resonance occurs at F1, the total capacitance in the measuring circuit must now be four times what it was before the unknown condenser was added, in order to halve the frequency. The maximum value of unknown condenser which can be measured is therefor three times the total capacitance in the measuring circuit at the position where the detector condenser is kept during the measurement. Larger values of Cx will give no resonance indication at all, and this is a great advantage. The oscillator scale may therefore be calibrated in capacitance units up to a maximum value equal to three times the total maximum capacitance in the measuring circuit.

The advantages which my apparatus and method have over previous ones are that:

(1) By using an oscillator having many harmonics, the inductance range of measurement can be greatly increased without a corresponding increase in components, and (2) The inductance scales can be direct-reading and are identified for each measured coil by a simple manipulation of the oscillator frequency, and (3) The pure inductance and self-capacitance of the coil can be quickly determined (without calculation) and (4) The ease of making a measurement is such that a non-technical person can be taught to make accurate measurements in a few minutes, and in making such measurements, no knowledge at all of harmonics, frequencies, or capacitances is required of the operator. See my Patent No. 2,091,109, granted August 24, 1937.

The principle on which this invention operates is a development of my earlier work on the relationships between tuned receivers and oscillators which are rich in harmonics and are made to excite the receivers.

Let a measuring circuit or receiver (as in Figures 1 and 2) be tuned to frequency F which is some harmonic $n$ of F1. F1 is a fundamental frequency of an oscillator rich in harmonics which is coupled to the receiver or measuring circuit. Fa is any higher frequency than F1 which also has a harmonic equal to F. If I uniformly vary the frequency of the oscillator from F1 to F2 and find that over this range there is no other frequency having a harmonic equal to F, I have shown that $$F = \frac{F2 F1}{(F2 - F1)} \quad (1)$$

In other words, F2 and F1 are here required to be successive response-producing fundamental frequencies of the oscillator. Solving for F2:

$$FF2 - FF1 = F2F1$$
$$F2(F-F1) = FF1$$
$$F2 = \frac{FF1}{(F-F1)} \quad (2)$$

For any harmonic $n$, the measuring frequency F is always an integral multiple of F1:

$$F = nF1 \quad (3)$$

Putting (3) into (2):

$$F2 = \frac{nF1^2}{(nF1-F1)} = \frac{nF1}{(n-1)}$$

or $$F2 = \frac{n}{(n-1)}F1 \quad (4)$$

Using (4), I can locate the scale-indicating positions on the oscillator dial. First, I make a table:

| $n$ | $(n-1)$ | $\left(\frac{n}{n-1}\right)$ | F2 |
|---|---|---|---|
| 1 | 0 | ------ | ------ |
| 2 | 1 | 2 | 2F1 |
| 3 | 2 | 3/2 | 3/2 F1 |
| 4 | 3 | 4/3 | 4/3 F1 |
| 5 | 4 | 5/4 | 5/4 F1 |
| 6 | 5 | 6/5 | 6/5 F1 |
| etc. | | | |

This table locates the various points on the oscillator dial shown in Fig. 1 and numbered from 2 to 6. These points have been identified in terms of F1 and do not change their position on the scale if F1 is altered, provided that the oscillator condenser is not changed. Thus F1 can be 50 kc. for one range and 500 kc. for another, but the scale-indicating points on the oscillator scale will stay right where they are.

From the above, it is clear that the frequency range of the oscillator must be at least 2 to 1.

Instead of using a variable tuning condenser in the oscillator, it is possible to substitute a multi-contact switch, so that each position of the switch will indicate the corresponding inductance scale. This is done by connecting a fixed condenser to each of the switch contacts. The capacitance of these condensers is made such as to cause the oscillator to oscillate at 2F1, 3/2F1, 4/3F1, 5/4F1, 6/5F1, and F1 at the starting or measuring position.

In Fig. 1 on the two measuring circuit scales, the first or #1 scale is shown on top and covers a range of 25 to 200 millihenries, approximately. The calibration points for this scale are obtained from the known frequency F1 (=50 kc.) and the accurately known capacitance for each point on the scale, using the well-known relationship $$f = \frac{1}{2\pi\sqrt{LC}} \quad (5)$$

in which $f$ is the frequency in cycles per second, L is the inductance value inscribed at the point in question on the top scale and is expressed in henries, C is the total capacitance ($C_D+C_o$) and is expressed in farads in the above formula. It does not include the coil's self-capacitance.

For greater convenience, the inductance scales in Fig. 1 are calibrated in millihenries.

Inductance values on scale #1 of the measuring circuit are calculated from the fixed frequency F1 (=50 kc. in this case) and the total capacitance ($C_D+C_o$) at each point. This first inductance scale is the first harmonic scale. A second harmonic scale "2" can be found using formula 5, the same capacitance values as for scale #1, by increasing the frequency to 2F1 (=100 kc.). Since the frequency is doubled, all inductance values for scale #2 are ¼ of the corresponding values on scale #1. Likewise, for the third-harmonic scale #3, all values are 1/9 of the #1 scale values. The inductance values on scale #4 are 1/16 of the corresponding values on scale #1, etc.

Thus I have an inductance scale calibrated for each harmonic which I wish to use. In the above case, I chose 6 harmonics and inspection of the scales shows a range of inductance values from .7 to 200 millihenries. This is an enormous range. The oscillator is held at 50 kc. fundamental frequency for the entire range.

Suppose now I wish to measure a coil whose induction falls somewhere within the measuring range. I connect it as in Fig. 2, coupling it loosely to the oscillator coupling coil. Then I vary the measuring condenser $C_d$ until I get a tuning peak in the vacuum-tube voltmeter. Assume that this peak is opposite the 40 mh. calibration on scale #1. Heretofore, the oscillator condenser has been held at the starting position at 50 kc. To identify which scale to use on the measuring dial, I now slowly change the frequency of the oscillator from 50 kc. to 100 kc., and note where the nearest response to 50 occurs. If such a second tuning peak occurs at point 2 on the oscillator scale, I know that I must read scale #2 of the measuring circuit, and the apparent inductance of coil $Lx$ is 10 mh. If the second response had occurred at point 3, reading scale #3 of the measuring circuit would give me 4 4/9 mh. If at at point 4, I would read scale #4 to get a value of 2½ mh., etc.

The function of the oscillator pointer is thus seen to be one of indicating for us which of the inductance scales to use.

Suppose that, in the above illustration, the coil I were trying to measure was less than 7 mh., and that when I tried to measure it the measuring condenser again peaked opposite 40 mh. on scale #1. Turning the oscillator condenser from 50 kc. towards 100 kc. would cause a second response to occur at some position 8 on the oscillator scale, and this position would lie between the starting position and point 6. This frequency would be 8/7 F1 for which I would have to read scale #8 (which I do not have) to find that small $Lx$ coil has an inductance of .625 mh. ($40/8^2 = .625$). Because I have limited arbitrarily and for mechanical reasons our number of scales to six, it is clear that any responses in the region between F1 and point 6 cannot be used to indicate a useful scale, and any coil giving such a response should be measured on some other higher frequency F1. To prevent such responses from baffling an inexperienced person using the device, it is well to filter out all oscillator harmonics beyond the sixth (in this case). In general, if there are N inductance scales, the filter must cut off the frequency $(N+1)F1$, and all higher frequencies. For simplicity, no filter circuit is shown in Fig. 2.

The inductance values read heretofore have all been "apparent" inductances. Every coil has a certain amount of self-capacitance. This self-capacitance, unless identified and corrected for, appears as additional inductance in the measurement.

In Formula 5, ($C_D+C_O$) was taken as the actual circuit capacitance of the apparatus. Suppose I measure a coil to be 10 mh. on scale #2. Opening the measuring circuit condenser I find a second tuning position at 11 mh. on scale #3, and perhaps 14 mh. on scale #4. The differences between these readings are all due to the effect of self-capacitance which required us to decrease $C_D$ by the exact amount of the self-capacitance of the coil to re-establish resonance, and resulted in a higher reading of inductance than the pure inductance.

Sometimes it is desirable to ascertain the self-capacitance of a coil. This is because it determines the coil's natural "period" or frequency, and also because it affects tuning ratios.

To achieve the measurement of pure inductance and self-capacitance, I have inserted variable condenser $C_O$ in Fig. 2. This condenser is arranged to have its maximum value in the circuit at the start of the measurement. It is desired to decrease its capacitance from this maximum by the amount of the self-capacitance of the coil. If I can somehow find out how much to decrease it, we will know the self-capacitance of the coil. $C_O$ has a scale affixed to it to measure capacitance deviation from its maximum value. My inductance scales are arranged to make this possible. It is done by adjusting $C_O$ by trial to a value such that inductance readings for a given coil shall be identical when made on any two scales. Thus, in the 10 mh. coil (read on scale #2) previously taken as an example, the scale #3 reading was 11 mh. I should now adjust the condenser $C_D$ to read slightly less than 10 mh. on scale #3 and then decrease $C_O$ for a resonance peak. Holding $C_O$ at this value I turn $C_d$ to produce resonance on scale #2 and I may find that the two readings (scales #2 and #3) are now identical. Then resonance on any scale will indicate the pure inductance of the coil, and the reduction in capacitance required of $C_O$ to bring this about is the self-capacitance of the coil.

In readings of pure inductance, it is seen to be necessary that I have at least two response points over the range $C_d$.

On the inductance scales in Fig. 1, the highest value of inductance which can be read in two places is seen to be 50 mh. It is the highest value calibrated on scale #2. The lowest value having two readings is 1 mh., the minimum value on the #5 scale. Also, the highest value on scale #3 must equal or exceed the lowest value on scale #1, for no missouts. Thus, if the highest value of inductance on scale #3 is 20 mh. and the lowest on scale #1 is 25 mh., any coil between 20 and 25 mh. will have only one position of resonance, and that one occurs on scale #2. To get over this difficulty, the ratio of total capacitances, maximum to minimum, must be sufficient for this purpose.

Any suitable frequency F1 may be used in the oscillator. In fact, several frequency bands are desirable to permit complete coverage of the useful inductance range. When bands are thus changed, if F1 is the lowest frequency of the first band, the next band may start at 10F1, the next at $10\sqrt{10F1}$ and the one after at 100F1, etc. In this manner, the same calibration points can be used on the inductance scales for units in millihenries, $\frac{1}{10}x$ microhenries, microhenries, $10x$ microhenries, etc.

When oscillator bands are thus switched, the positions 2, 3, 4, 5, 6, etc., on the oscillator scale remain where they are for all bands.

In Fig. 2, $Lx$ is the secondary winding of the transformer shown, and is loosely coupled to the primary or output coil of the oscillator. It is not intended to limit my apparatus to this type of coupling, as there are many other ways in which it can be done, and the method shown is suitable for explanation of the principles involved.

The vacuum-tube voltmeter shown in Fig 2, should have a high impedance over the useful range of frequencies.

While the invention has been described in detail and with respect to certain present preferred forms which the invention may assume, it is not to be limited to such details and forms, since many changes and modifications may be made in the invention without departing from the spirit and scope of the invention in its broadest aspects. Hence it is desired to cover any and all forms and modifications of the invention which may come within the language or scope of any one or more of the appended claims.

Having thus described the invention, what I claim as new and desire to secure by Letters Patent is:

1. A device for measuring inductance which comprises an oscillator for generating harmonics, a measuring circuit connected to be energized by said harmonics and consisting of a coil of unknown inductance and a variable condenser; said condenser having a series of inductance scales, each of which is calibrated for a different harmonic of the fixed starting frequency of the oscillator; means for indicating resonance in the measuring circuit, means for changing the fundamental frequency of the oscillator from its starting value, and a scale adjacent the oscillator for indicating different harmonic frequencies, with each division on said scale corresponding with one of the inductance scales of said variable condenser.

2. In combination, an oscillator generating harmonics, a tuned circuit coupled to the oscillator and consisting of a coil of unknown inductance, a variable condenser, a suitable resonance indicator for the tuned circuit, and inductance scales, one for each harmonic frequency, associated with the variable condenser, and a scale for the oscillator for indicating different harmonic frequencies, with each division on said scale corresponding with one of the inductance scales of said variable condenser.

3. In combination, an oscillator for generating harmonics, a tuned measuring circuit for receiving said harmonics and containing means for detecting resonance and scales for said means calibrated in terms of inductance, one for each of said harmonics, said circuit having a tuning condenser, an inductance coil, and calibrated means for decreasing the total circuit capacitance by the amount of the coil capacitance, and a frequency scale for the oscillator with indications each corresponding to one of said scales.

4. An apparatus for the measurement of the pure inductance and self-capacitance of a coil, consisting of an oscillator which generates harmonics, a measuring circuit receiving said harmonics and comprising an unknown coil in parallel with a tuning condenser and a vernier condenser in parallel with the main tuning condenser, so that said vernier may be decreased by an amount to equal the coil's self-capacitance, a scale for the oscillator to indicate the separate harmonics, the tuning condenser having several scales calibrated in inductance units, each such scale being for a different harmonic, the capacitance range of this tuning condenser being sufficient to permit at least two resonance indications for any coil within the range of the instrument.

EDWARD M. SHIEPE.

REFERENCES CITED

The following references are of record in the file of this patent:

UNITED STATES PATENTS

| Number | Name | Date |
|---|---|---|
| 2,091,109 | Shiepe | Aug. 24, 1937 |
| 2,135,017 | Sharland | Nov. 1, 1938 |
| 2,309,934 | Clay | Feb. 2, 1943 |
| 2,337,759 | Loughlin | Dec. 28, 1943 |

FOREIGN PATENTS

| Number | Country | Date |
|---|---|---|
| 663,437 | France | Aug. 21, 1929 |

OTHER REFERENCES

Radio World, July 1936, pages 45–51.
Wireless World, February 1944, pages 37–40.